United States Patent
Van Wiemeersch et al.

(10) Patent No.: US 10,625,545 B2
(45) Date of Patent: Apr. 21, 2020

(54) METHODS AND APPARATUS TO FACILITATE TPMS BROADCAST MODE SELECTION

(71) Applicant: Ford Global Technologies, LLC, Dearborn, MI (US)

(72) Inventors: John Robert Van Wiemeersch, Novi, MI (US); Ali Hassani, Ann Arbor, MI (US); Dilip B Patel, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/279,249

(22) Filed: Feb. 19, 2019

(65) Prior Publication Data
US 2019/0184775 A1 Jun. 20, 2019

Related U.S. Application Data

(63) Continuation of application No. 15/845,293, filed on Dec. 18, 2017, now Pat. No. 10,245,904.

(51) Int. Cl.
| | |
|---|---|
| *B60C 23/04* | (2006.01) |
| *H04L 29/08* | (2006.01) |
| *H04W 12/10* | (2009.01) |
| *H04W 12/00* | (2009.01) |

(52) U.S. Cl.
CPC ...... *B60C 23/0442* (2013.01); *B60C 23/0462* (2013.01); *H04L 67/12* (2013.01); *H04W 12/0013* (2019.01); *H04W 12/1006* (2019.01)

(58) Field of Classification Search
CPC ..... B60C 23/00; B60C 23/02; B60C 23/0442; B60C 23/0462; B60C 23/0477; G01M 17/02; H04L 67/12; H04W 12/1006; H04W 12/0013

USPC ....... 340/442, 445, 446, 447; 73/146, 146.4, 73/146.5
See application file for complete search history.

(56) References Cited

U.S. PATENT DOCUMENTS

| | | | |
|---|---|---|---|
| 6,937,144 B2 | 8/2005 | Drake et al. | |
| 6,972,691 B2 | 12/2005 | Okubo | |
| 7,042,348 B2 | 5/2006 | Schulze et al. | |
| 7,741,964 B2 | 6/2010 | Strahan | |
| 8,742,912 B2* | 6/2014 | Blanchard | B60C 23/041 340/442 |
| 8,744,401 B2 | 6/2014 | Peterson | |

(Continued)

FOREIGN PATENT DOCUMENTS

CN 206426764 U 8/2017

OTHER PUBLICATIONS

Deirdre K. Kilcoyne et al., Tire Pressure Monitoring System Encryption to Improve Vehicular Security, Nov. 2016, 3 pages.

*Primary Examiner* — Hung T Nguyen
(74) *Attorney, Agent, or Firm* — Frank Lollo; Eversheds Sutherland (US) LLP (57) ABSTRACT

Method and apparatus are disclosed to facilitate TPMS broadcast mode selection. An example vehicle comprises sensors, a processor, and memory. The processor is in communication with the memory and with the sensors. The processor is configured to: receive an unencrypted signal indicating an abnormal tire pressure, enter an encrypted mode with the sensors, receive an encrypted follow up tire pressure status from the sensors, and determine whether the unencrypted signal is authentic based on the encrypted follow up tire pressure status.

16 Claims, 5 Drawing Sheets

(56) References Cited

U.S. PATENT DOCUMENTS

| | | |
|---|---|---|
| 9,420,408 B2 | 8/2016 | Liu |
| 9,560,071 B2 | 1/2017 | Ruvio et al. |
| 9,724,972 B2 | 8/2017 | Zucchetti |
| 9,796,219 B2 | 10/2017 | Chong |
| 2003/0164033 A1 | 9/2003 | Ghabra |
| 2004/0066288 A1* | 4/2004 | Okumura ............ B60C 23/0408 340/445 |
| 2008/0297337 A1 | 12/2008 | Marguet |
| 2010/0256946 A1* | 10/2010 | Carresjo ............. B60C 23/0462 702/138 |
| 2012/0262285 A1* | 10/2012 | Ho ...................... B60C 23/0455 340/442 |
| 2014/0139332 A1* | 5/2014 | Mouchet ............ B60C 23/0479 340/442 |

* cited by examiner

METHODS AND APPARATUS TO FACILITATE TPMS BROADCAST MODE SELECTION

CROSS-REFERENCE TO RELATED APPLICATIONS

This application is a continuation of U.S. patent application Ser. No. 15/845,293 filed on Dec. 18, 2017, now U.S. Pat. No. 10,245,904, which is herein incorporated by reference in its entirety.

TECHNICAL FIELD

The present disclosure generally relates to tire pressure management systems (TPMS) and, more specifically, methods and apparatus to facilitate TPMS broadcast mode selection.

BACKGROUND

In recent years, vehicles have been equipped with TPMS to detect low tire pressure and alert a driver of the low tire pressure. TPMS sensors are often located inside wheel and tire assemblies of a vehicle. TPMS sensors include and are powered by a battery. TPMS sensors measure air pressure inside a wheel and tire assembly and transmit the measurement to the vehicle via radio signal.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises sensors, a processor, and memory. The processor is in communication with the memory and with the sensors. The processor is configured to: receive an unencrypted signal indicating an abnormal tire pressure, enter an encrypted mode with the sensors, receive an encrypted follow up tire pressure status from the sensors, and determine whether the unencrypted signal is authentic based on the encrypted follow up tire pressure status.

An example method is disclosed. The method comprises: receiving, with a processor, an unencrypted signal indicating an abnormal tire pressure; entering, with the processor, an encrypted mode with sensors; receiving, with the processor, an encrypted follow up tire pressure status from the sensors; and determining, with the processor, whether the unencrypted signal is authentic based on the encrypted follow up tire pressure status.

An example system is disclosed. The system comprises sensors, wheel and tire assemblies, and a processor. The sensors are disposed in the wheel and tire assemblies. The processor is in communication with the sensors. The processor is configured to: receive an unencrypted signal including first tire pressure data, selectively enter an encrypted communication mode with the sensors based on the first tire pressure data, transmit an encrypted request to the sensors for second tire pressure data, receive an encrypted signal from the sensors including the second tire pressure data, and authenticate the unencrypted signal based on the first tire pressure data and the second tire pressure data.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Traditionally, most vehicle manufacturers do not encrypt signals transmitted by TPMS sensors to vehicles. This is done primarily to prolong battery life of the TPMS sensors because unencrypted signals have substantially fewer bits than encrypted messages. Unencrypted signals are also used to simplify pairing of the TPMS sensors with vehicle receivers. However, use of unencrypted TPMS signals may leave vehicles vulnerable to radio signals sent by third parties. Such third party radio signals may simply be interfering radio noise. However, some third party radio signals are intentionally broadcast as cyber attacks to provoke false tire pressure alerts in vehicles. Third parties who send such signals are often referred to as spoofers. The practice of sending such signals is referred to as spoofing. The false tire pressure alert may prompt a driver to pull over and exit his or her vehicle to inspect the tires. The spoofer(s) may then exploit this situation.

Wireless technologies offer the capability to mitigate these interfering radio noise and spoofing concerns via TPMS sensor localization and encryption of communication between TPMS sensors and the vehicle through use of a paired or bonded connection. However, communicating in an encrypted mode consumes more battery charge than broadcasting in an unencrypted mode. This disclosure provides methods and apparatus to switch between unencrypted and encrypted communication modes between TPMS sensors and vehicle receiver(s). By switching communication modes, radio interference noise concerns, spoofing concerns, and system power consumption concerns may be balanced.

Figure 1:
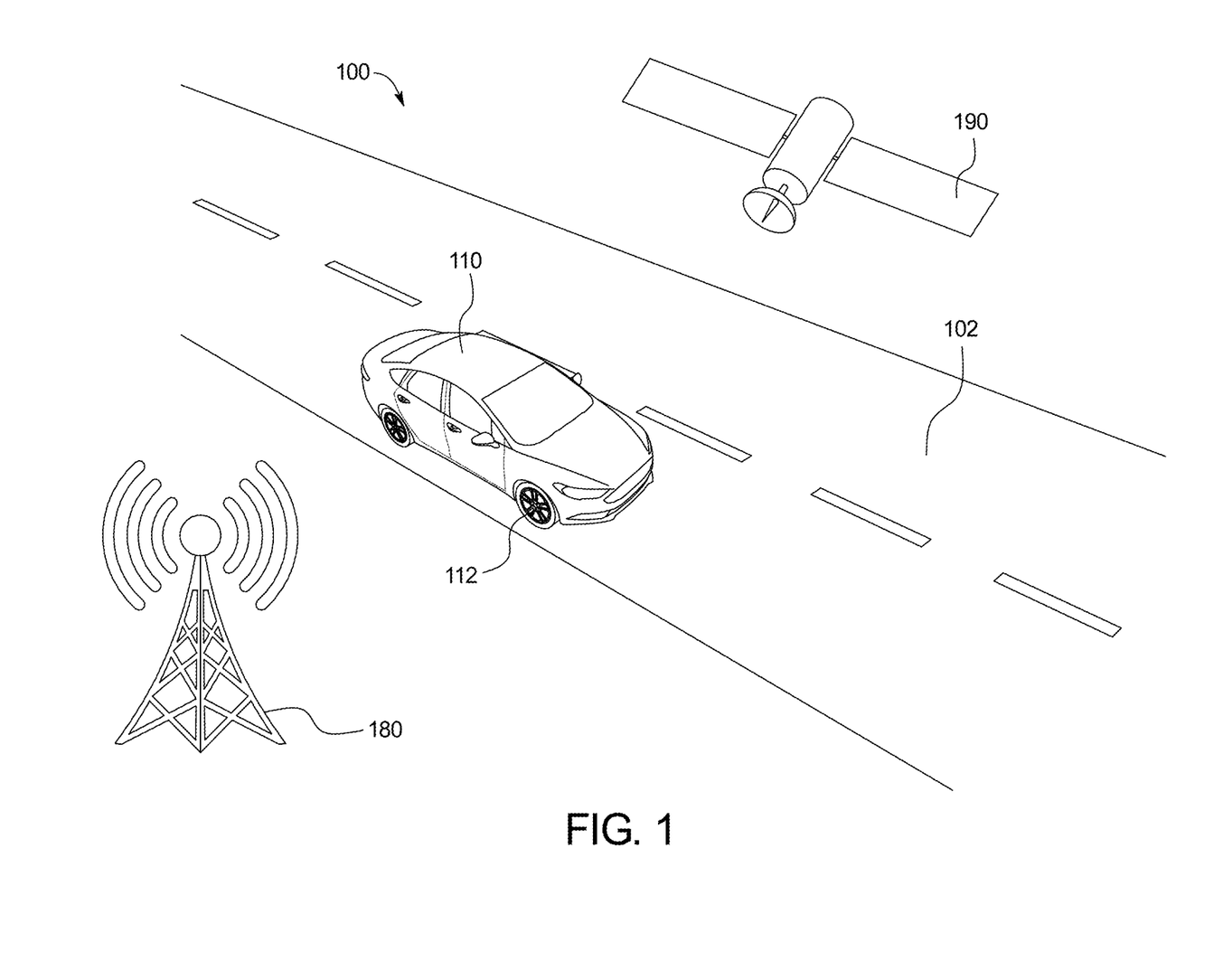
FIG. 1 illustrates a vehicle operating in accordance with the teachings of this disclosure in an environment.
Figure 2:
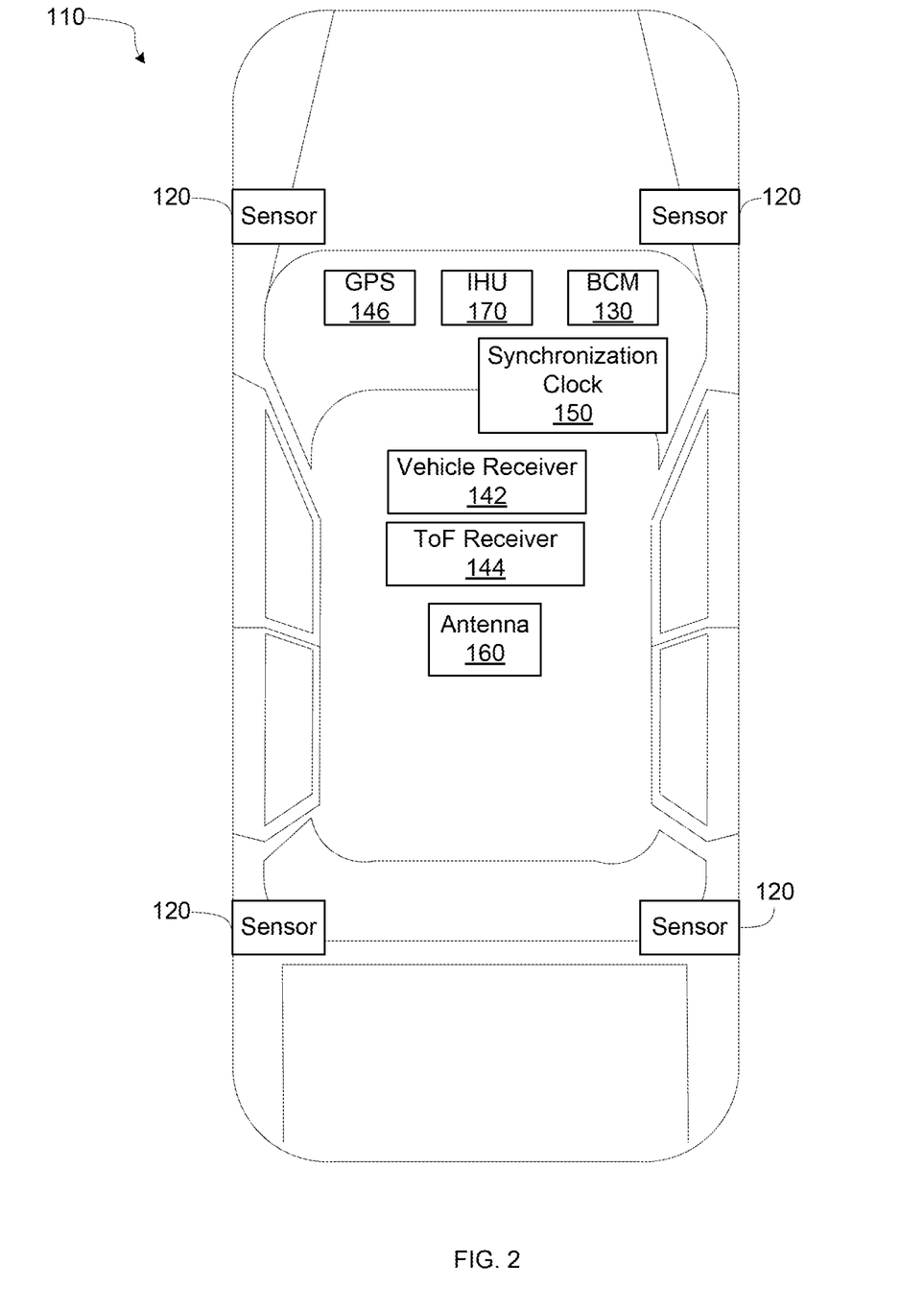
FIG. 2 is a schematic view of the vehicle of FIG. 1.

FIG. 1 illustrates a vehicle 110 operating in accordance with the teachings of this disclosure in an environment 100. FIG. 2 is a schematic view of the vehicle 110 of FIG. 1. As shown in FIGS. 1 and 2, the environment 100 includes a roadway 102, the vehicle 110, a third-party radio signal source 180, and a global positioning system (GPS) satellite 190. The vehicle 110 includes wheel and tire assemblies 112, sensors 120, a body control module (BCM) 130, a vehicle receiver 142, a time of flight (ToF) receiver 144, a GPS receiver 146, a synchronization clock 150, an antenna 160, and an infotainment head unit 170 (IHU).

As the vehicle 110 travels along the roadway 102, the vehicle 110 receives location data from the GPS satellite 190 via the GPS receiver 146. Normally, the vehicle receiver 142 receives signals from the sensors 120. However, when the vehicle 110 is near the third-party radio signal source 180, the vehicle 110 may occasionally inadvertently receive radio signals from the third-party radio signal source 180 via the vehicle receiver 142. As discussed above, these third-party radio signals may simply be radio signal noise. However, in some instances, the third-party radio signals may be sent by spoofers during a spoofing attempt. The vehicle 110 detects and dismisses the inadvertent radio signals and/or spoofing attempts, as will be explained in greater detail below.

The sensors 120 may be arranged in and around the vehicle 110 in any suitable fashion. The sensors 120 may be mounted to measure properties around the exterior of the vehicle 110. Additionally, some sensors 120 may be mounted inside the cabin of the vehicle 110 or in the body of the vehicle 110 (such as, the engine compartment, the wheel wells, etc.) to measure properties in the interior of the vehicle 110. For example, such sensors 120 may include accelerometers, odometers, tachometers, pitch and yaw sensors, wheel speed sensors, microphones, tire pressure sensors, and biometric sensors, etc. In the illustrated example, the sensors 120 are tire pressure sensors. The sensors 120 sense tire pressure inside the wheel and tire assemblies 112. The sensors 120 broadcast wireless signals according to predetermined cadences. The wireless signals are broadcast as data packets of air pressure measurements, sensor identifications, and/or timestamps. In some examples, where the sensors 120 are programmed with air pressure thresholds, the data packets include an air pressure alert message and/or a request to enter an encrypted mode. The cadences correspond to differing vehicle use states (e.g., factory mode, transport mode, standard mode, etc.) and to travel states (e.g., start of motion, long term motion, end of motion, loss of pressure, low speed, highway speed, etc.).

The body control module 130 controls various subsystems of the vehicle 110. For example, the body control module 130 may control power windows, power locks, an immobilizer system, and/or power mirrors, etc. The body control module 130 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc.

The vehicle receiver 142 receives internal pressure data of the wheel and tire assemblies 112 via wireless signals from the sensors 120. The time of flight (ToF) receiver 144 receives wireless signals from the sensors 120. The ToF receiver 144 generates localization data of the sensors 120 based on the wireless signals. More specifically, in some examples, the ToF receiver 144 measures signal strengths of the received signals to generate the localization data. Further, in some examples, the ToF receiver 144 measures elapsed travel flight times of the signals from the sensors 120 to the ToF receiver 144 to generate the localization data. Moreover, in some examples, the ToF receiver 144 measures arrival angles of the signals at the ToF receiver 144 to generate the localization data. In some examples, the vehicle receiver 142 includes the ToF receiver 144.

The GPS receiver 146 receives GPS data from the GPS satellite 190. GPS data includes location coordinates (e.g., latitude and longitude).

The synchronization clock 150 generates time data. This time data is used to track whether wireless signals purportedly from the sensors 120 arrive according to the predetermined cadences.

The antenna 160 sends wireless wake-up request signals to the sensors 120 to begin encrypted mode activation. In some examples, the antenna 160 is located in the B pillars of the vehicle 110. In some examples, the antenna 160 is included in a passive entry start system (PEPS). In some examples, the antenna 160 is included in a remote park assist (rePA) system.

The infotainment head unit 170 provides an interface between the vehicle 110 and a user. The infotainment head unit 170 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 170 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 170 displays the infotainment system on, for example, the center console display.

Figure 3:
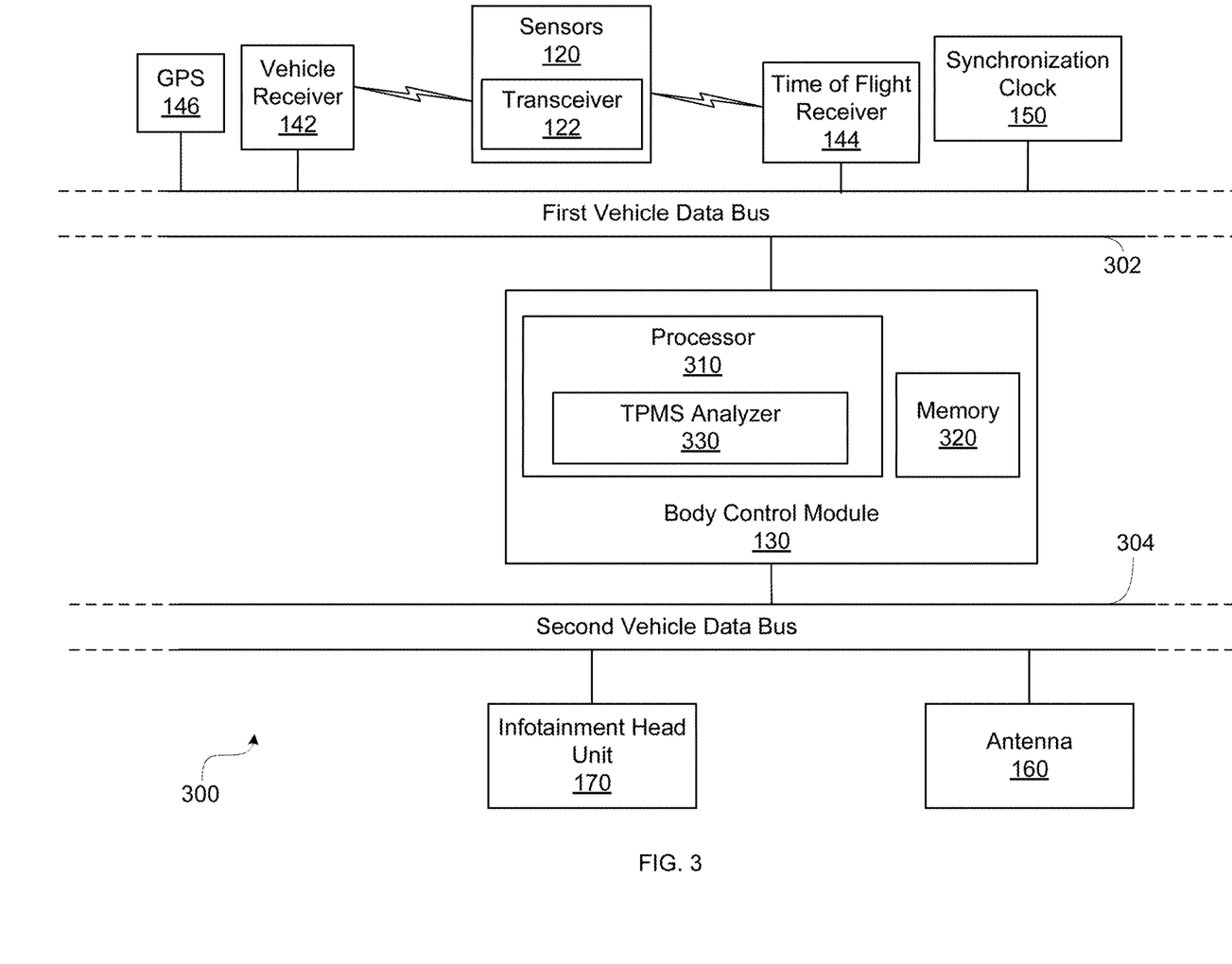
FIG. 3 is a block diagram of the electronic components of the vehicle of FIG. 1.

FIG. 3 is a block diagram of the electronic components 300 of the vehicle 110 of FIG. 1. The sensors 120 include a bidirectional transceiver 122. The sensors 120 are in wireless communication with the vehicle receiver 142 and/or with the ToF receiver 144 via the bidirectional transceiver 122. The first vehicle data bus 302 communicatively couples the GPS receiver 146, the vehicle receiver 142, the ToF receiver 144, the synchronization clock 150, the BCM 130, and other devices connected to the first vehicle data bus 302. In some examples, the first vehicle data bus 302 is implemented in accordance with the controller area network (CAN) bus protocol as defined by International Standards Organization (ISO) 11898-1. Alternatively, in some examples, the first vehicle data bus 302 may be a Media Oriented Systems Transport (MOST) bus, or a CAN flexible data (CAN-FD) bus (ISO 11898-7). The second vehicle data bus 304 communicatively couples the BCM 130, the infotainment head unit 170, and the antenna 160. The second vehicle data bus 304 may be a MOST bus, a CAN-FD bus, or an Ethernet bus. In some examples, the BCM 130 communicatively isolates the first vehicle data bus 302 and the second vehicle data bus 304 (e.g., via firewalls, message brokers, etc.). Alternatively, in some examples, the first vehicle data bus 302 and the second vehicle data bus 304 are the same data bus.

The BCM 130 includes a processor or controller 310 and memory 320. In the illustrated example, the BCM 130 is structured to include TPMS analyzer 330. Alternatively, in some examples, the TPMS analyzer 330 may be incorporated into another electronic control unit (ECU) with its own processor 310 and memory 320. The processor or controller 310 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 320 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 320 includes multiple kinds of memory, particularly volatile memory and non-volatile memory.

The memory 320 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 320, the computer readable medium, and/or within the processor 310 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

Figure 4:
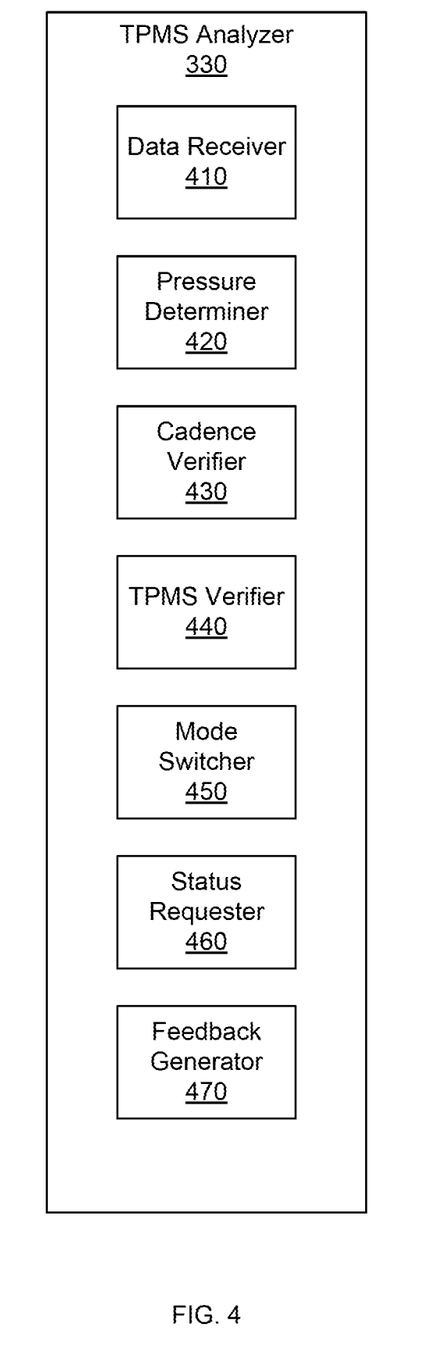
FIG. 4 is a more detailed block diagram of the TPMS analyzer of FIG. 3.

FIG. 4 is a more detailed block diagram of the TPMS analyzer 330 of FIG. 3. The TPMS analyzer 330 includes a data receiver 410, a pressure determiner 420, a cadence verifier 430, a TPMS verifier 440, a mode switcher 450, a status requester 460, and a feedback generator 470.

In operation, the data receiver 410 receives unencrypted and encrypted signals sent by the sensors 120 via the vehicle receiver 142. In operation, the data receiver 410 may also receive signals via the vehicle receiver 142 purportedly from the sensors 120, but that are actually sent by spoofers or are radio interference. The signals from the sensors 120, spoofers, and/or radio interference may include data packets of tire pressure data. It should be understood that the signals are of unknown origin when the signals are initially received by the data receiver 410 in the unencrypted mode.

In operation, the pressure determiner 420 determines whether air pressure in the wheel and tire assemblies 112 is acceptable using the air pressure data packets. More specifically, the pressure determiner 420 compares the air pressure measurements in the data packets to a predetermined air pressure range stored in the memory 320. In other words, the pressure determiner 420 determines whether tire pressure purportedly reported by the sensors 120 is within the predetermined air pressure range kept in the memory 320. In yet other words, the pressure determiner 420 determines whether the signals received by the data receiver 410 indicate an abnormal tire pressure outside of the predetermined range stored in the memory 320. Thus, the pressure determiner 420 determines whether tire pressure is normal (e.g., within tolerance, proper, OK, etc.) or abnormal (e.g., out of tolerance, improper, not OK, etc.) based on the signals received by the data receiver 410 and the predetermined air pressure range from the memory 320. In some examples, where the sensors 120 are programmed with the predetermined air pressure range and send air pressure alert messages, the pressure determiner 420 accesses and reads the air pressure alert message.

In operation, the cadence verifier 430 determines whether the wireless signals received by the data receiver 410 purportedly from the sensors 120 were received according to the predetermined cadence corresponding to the vehicle and/or travel state of the vehicle 110. The predetermined cadences are stored in the memory 320. More specifically, the cadence verifier 430 compares arrival times of the wireless signals to time data generated by the synchronization clock 150.

In operation, the TPMS verifier 440 authenticates the sensors 120 and determines whether the received wireless signals are actually from the sensors 120. In other words, the TPMS verifier 440 verifies the sensors 120 as authentic sources of encrypted signals received during an encrypted mode and determines whether unencrypted signals received by the data receiver 410 from radio sources purporting to be the sensors 120 during an unencrypted mode are authentic.

More specifically, the TPMS verifier 440 compares a secret key response from the sensors 120 to a secret key stored in the memory 320, localizes the sensors 120, and determines whether pressure data received purportedly from the sensors 120 during the unencrypted mode matches pressure data received from the sensors 120 during the encrypted mode. Thus, the sensors 120 are verified as authentic encrypted signal sources and encrypted signals received from the sensors 120 during the encrypted mode are verified as authentic.

More specifically, to localize the sensors 120, the TPMS verifier 440 sends encrypted requests to the sensors 120 via the antenna 160. In some examples, the TPMS verifier 440 then determines whether the signal strengths of the received encrypted reply signals from the sensors 120 match a predetermined range of signal strengths. In some such examples, the signal strengths are measured as a received signal strength indicator (RSSI), as used in the IEEE 802.11 wireless standard. In some examples, the TPMS verifier 440 determines whether the elapsed travel flight times of the received signals match a predetermined range of flight times. In some examples, the TPMS verifier 440 determines whether the arrival angles of the received signals match a predetermined range of arrival angles. The predetermined localization ranges of signal strengths, flight times, and/or arrival angles are stored in the memory 320. When the received reply signals match the predetermined localization ranges, the sensors 120 are localized. Thus, the sensors 120 are verified as authentic encrypted signal sources and encrypted signals received from the sensors 120 during the encrypted mode are verified as authentic.

Further in operation, if the TPMS verifier 440 determines that unencrypted pressure data received during the unencrypted mode does not match encrypted pressure data received from the sensors 120 during the encrypted mode, the TPMS verifier 440 determines that the received unencrypted wireless signals are false pressure messages not from the sensors 120. It should be understood that a match between the unencrypted pressure data and the encrypted pressure data may be within a reasonable accuracy band that accounts for accuracy of the sensors 120, noise amongst the electronic components 300, losses from an actual air leak, etc. For example, the reasonable accuracy band between the unencrypted and encrypted pressure data may be plus or minus 1 pound per square inch (PSI), 2 PSI, etc. In other words, if air pressure data in the initially received unencrypted signal does not match air pressure data in a follow-up encrypted signal known to be from the sensors 120, the unencrypted signal is not authentic. In such cases, the TPMS verifier 440 requests GPS data from the GPS receiver 146 and time data from the synchronization clock 150. The TPMS verifier 440 stores the false pressure message, GPS coordinates where the false pressure message was received, and the time when the false pressure was received in the memory 320. The location and time data associated with the false pressure message may be used to mark a location as having high radio noise interference for drivers and/or to find spoofers.

In operation, the mode switcher 450 switches the vehicle receiver 142 from an encrypted mode to an unencrypted mode and vice versa based on determinations from the pressure determiner 420, the cadence verifier 430, and/or the TPMS verifier 440. More specifically, the mode switcher 450 switches the vehicle receiver 142 from the unencrypted mode to the encrypted mode when the received signals do not arrive according to the predetermined cadence and/or the air pressure in one or more of the wheel and tire assemblies 112 is abnormal, that is, outside of the predetermined pressure ranges. In some examples, where the sensors 120 are programmed with the predetermined air pressure range, the sensors 120 may send mode switch requests to enter the encrypted mode. Additionally or alternatively, the mode switcher 450 switches the vehicle receiver 142 from the unencrypted mode to the encrypted mode in response to the mode switch requests. Further, the mode switcher 450 switches the vehicle receiver 142 from the encrypted mode to the unencrypted mode when the received signals fail to provide a matching secret key and/or when the pressure data received during the unencrypted mode does not match pressure data received from the sensors 120 during the encrypted mode.

In operation, the status requester 460 generates signals (e.g., wake up requests, secret key requests, mode switch requests, pressure data requests, follow-up pressure data requests, etc.) for wireless transmission to the sensors 120 via the antenna 160. During the unencrypted mode, the wireless signals are unencrypted. During the encrypted mode, the wireless signals are encrypted. It should be understood that the vehicle 110 requests the sensors 120 to enter the encrypted mode via the status requester 460 and the antenna 160. In some examples, the mode switch requests to enter the encrypted mode are sent via a low frequency and/or low energy transmission. Thus, battery power in the sensors 120 is conserved.

In operation, the feedback generator 470 generates feedback messages for display on the IHU 170. The feedback messages alert the driver that tire pressure in one or more of the wheel and tire assemblies 112 is abnormal, that is, outside of the predetermined range (e.g., too low or too high).

Figure 5:
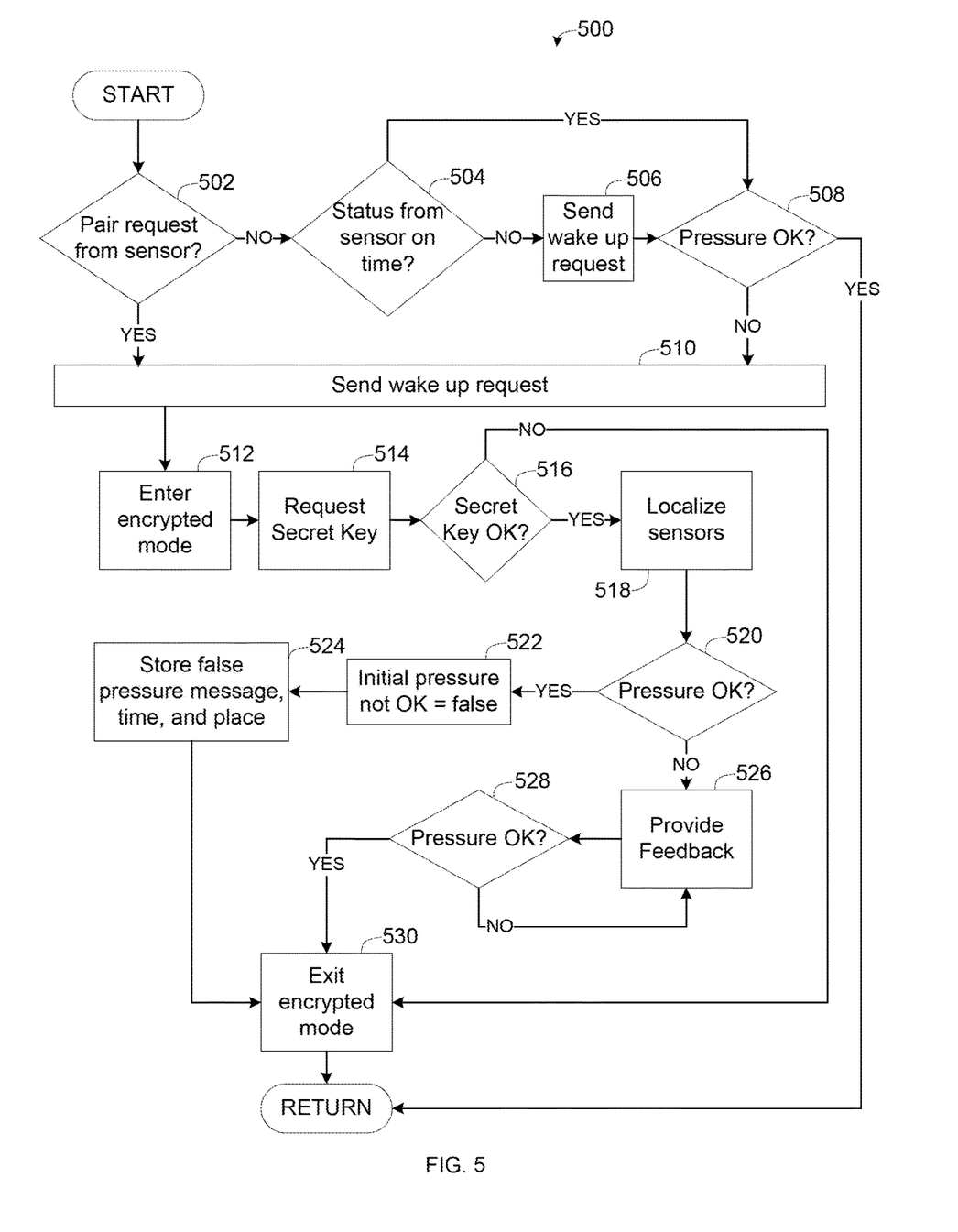
FIG. 5 is a flowchart of a method to analyze tire pressure signals, which may be implemented by the electronic components of FIG. 3.

FIG. 5 is a flowchart of a method 500 to analyze tire pressure signals, which may be implemented by the electronic components 300 of FIG. 3. The flowchart of FIG. 5 is representative of machine readable instructions stored in memory (such as the memory 320 of FIG. 3) that comprise one or more programs that, when executed by a processor (such as the processor 310 of FIG. 3), cause the vehicle 110 to implement the example TPMS analyzer 330 of FIGS. 3 and 4. Further, although the example program(s) is/are described with reference to the flowchart illustrated in FIG. 5, many other methods of implementing the example TPMS analyzer 330 may alternatively be used. For example, the order of execution of the blocks may be changed, and/or some of the blocks described may be changed, eliminated, or combined.

Initially, at block 502, the pressure determiner 420 determines whether an initial received signal includes a request to enter an encrypted mode. It should be understood that this initial received signal purportedly from one of the sensors 120 may in fact be broadcast by a spoofer. Thus, it should be understood that, at block 502, this initial received signal is of unknown origin.

If, at block 502, the pressure determiner 420 determines that the initial received signal includes a request to enter the encrypted mode, the method 500 proceeds to block 510. As explained above, the sensors 120 may send these encrypted mode entry requests in examples where the sensors 120 are programmed with pressure thresholds.

If, at block 502, the pressure determiner 420 determines that the initial received signal does not include a request to enter the encrypted mode, the method 500 proceeds to block 504.

In other words, by performing block 502, the pressure determiner 420 determines whether the initial received signal justifies entering the encrypted mode directly after receipt of the initial received signal.

At block 504, the cadence verifier 430 determines whether the initial received signal arrived according to a predetermined cadence.

If, at block 504, the cadence verifier 430 determines that the initial received signal did not arrive according to a predetermined cadence, the method 500 proceeds to block 506.

At block 506, the status requester 460 sends a wake up request to the sensors 120 via the antenna 160. In some examples, the wake up request is unencrypted. In other examples, the wake up request is encrypted. The method 500 then proceeds to block 508.

If, at block 504, the cadence verifier 430 determines that the initial received signal arrived according to a predetermined cadence, the method 500 proceeds to block 508.

At block 508, the pressure determiner 420 determines whether air pressure data included in the initial received signal is within a predetermined range. In other words, at block 508, the pressure determiner 420 determines whether air pressure indicated by the initial received signal is normal (e.g., within range, OK, etc.) or abnormal (e.g., out of range, not OK, etc.).

If, at block 508, the pressure determiner 420 determines that the air pressure data is within the predetermined range, the method 500 ends.

If, at block 508, the pressure determiner 420 determines that the air pressure data is not within the predetermined range, the method 500 proceeds to block 510.

At block 510, the status requester 460 sends a wake up request to the sensors 120 via the antenna 160. In some examples, the wake up request is unencrypted. In other examples, the wake up request is encrypted. The method 500 then proceeds to block 512.

At block 512, the mode switcher 450 switches the vehicle receiver 142 to the encrypted mode and the status requester 460 sends a mode switch request to the sensors 120 via the antenna 160. In some examples, the mode switch request is unencrypted. In other examples, the mode switch request is encrypted. The method 500 then proceeds to block 514.

At block 514, the status requester 460 sends an encrypted secret key request to the sensors 120 via the antenna 160. The method 500 then proceeds to block 516.

At block 516, the TPMS verifier 440 determines whether encrypted replies to the secret key request from the sensors 120 match the secret key stored in the memory 320.

If, at block 516, the TPMS verifier 440 determines that the encrypted replies to the secret key request from the sensors 120 do not match the secret key stored in the memory 320, the TPMS verifier 440 dismisses the received air pressure signal and the method 500 proceeds to block 530.

If, at block 516, the TPMS verifier 440 determines that the replies to the secret key request from the sensors 120 match the secret key stored in the memory 320, the method 500 proceeds to block 518.

At block 518, the TPMS verifier 440 localizes the sensors 120 and the status requester 460 sends an encrypted follow-up request for air pressure data. In other words, at block 518, the TPMS verifier 440 verifies the sensors 120 as authentic sources of encrypted signals based on signal flight time, arrival angle and/or strength and the status requester 460 sends an encrypted follow up tire pressure status request to the sensors 120. The method then proceeds to block 520.

At block 520, the pressure determiner 420 determines whether air pressure data included in the received encrypted reply signal is within a predetermined range. In other words, at block 520, the pressure determiner 420 determines whether air pressure indicated by the received encrypted tire follow-up status reply signal is normal (e.g., within range, OK, etc.) or abnormal (e.g., out of range, not OK, etc.)

If, at block 520, the pressure determiner 420 determines that the air pressure data is not within the predetermined range, the method 500 proceeds to block 526.

If, at block 520, the pressure determiner 420 determines that the air pressure data is within the predetermined range, the method 500 proceeds to block 522.

At block 522, the TPMS verifier 440 determines that, because the pressure data received during the unencrypted mode via the initial received signal does not match pressure data received from the sensors 120 during the encrypted mode, the pressure data received during the unencrypted mode and, thus, the initial received signal is false (e.g., not authentic). The method 500 then proceeds to block 524.

At block 524, the TPMS verifier 440 stores the false pressure data and corresponding GPS coordinates and time data in the memory 320. The method 500 then proceeds to block 530.

At block 530, the mode switcher 450 switches the vehicle receiver 142 from the encrypted mode to the unencrypted mode. The method 500 then returns to block 502.

At block 526, the feedback generator 470 generates a tire pressure alert message indicating the abnormal tire pressure for display to a driver via the IHU 170. The method 500 then proceeds to block 528.

At block 528, and the status requester 460 sends an encrypted request for air pressure data and the pressure determiner 420 determines whether air pressure data included in the received encrypted reply signal is within a predetermined range.

If, at block 528, the pressure determiner 420 determines that the air pressure data is not within the predetermined range, the method 500 returns to block 526. Thus, the tire pressure alert message is displayed via the IHU 170 until the wheel and tire assemblies 112 are inflated to within the predetermined range.

If, at block 528, the pressure determiner 420 determines that the air pressure data is within the predetermined range, the feedback generator 470 removes (e.g., stops displaying) the tire pressure alert message from the IHU 170 and the method 500 proceeds to block 530, discussed above.

In some examples, the method 500 performs block 526 and block 528 after performing block 530. In such an example arrangement, the method 500 returns to block 502 after the pressure determiner 420 determines that the air pressure data is within the predetermined range. Thus, in such an example arrangement, the method 500 provides feedback indicating low tire pressure to a driver and monitors the tire pressure after exiting the encrypted mode. It should be appreciated that monitoring tire pressure and providing feedback outside of the encrypted mode after authenticating the sensors 120 may conserve battery power of the sensors 120.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may aid drivers in operating vehicles by preventing display of false and/or inauthentic tire pressure alert messages. Further, operating in an unencrypted mode when tire pressure is within a predetermined range and switching from the unencrypted mode to an encrypted when tire pressure is indicated as being outside the predetermined range conserves battery power of TPMS sensors. Additionally, storing location and time data related to false and/or inauthentic tire pressure alert messages may aid drivers to recognize areas having radio signal interference and/or may aid in discovering spoofers. It should also be appreciated that the disclosed apparatus and methods provide a specific solution—switching between unencrypted and encrypted modes to verify authenticity of tire pressure wireless signals based on content of the signals—to a specific problem—limited battery capacity of TPMS sensors to operate continuously in a encrypted mode in view of drivers who are prompted to stop and exit their vehicles in response to false and/or inauthentic unencrypted tire pressure alert messages. Further, the disclosed apparatus and methods provide an improvement to computer-related technology by increasing functionality of a processor to switch between unencrypted and encrypted communication modes in response to data included in an initial wireless signal, request an encrypted follow-up wireless signal, determine whether the initial wireless signal is authentic based on the encrypted follow-up wireless signal, and associate location and time data with inauthentic initial wireless signals.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle tire pressure monitoring system comprising:
a tire pressure sensor including:
memory storing a threshold value;
a controller to:
determine whether a tire pressure data measured by the tire pressure sensor is abnormal based on the threshold value; and
when the tire pressure data measured by the tire pressure sensor is abnormal, transmit a mode switch request to enter an encrypted mode with a body control module, and transmit the tire pressure data using an encrypted signal; and
the body control module to accept the tire pressure data after authenticating the encrypted signal.

2. The system of claim 1, further comprising a global positioning system (GPS) receiver, wherein in response to receiving the tire pressure data that is indicative of being abnormal via an unencrypted signal, the body control module is to:
associate location data from the GPS receiver with the unencrypted signal; and
store the associated unencrypted signal and location data in vehicle memory.

3. The system of claim 1, further comprising a synchronization clock, wherein in response to receiving the tire pressure data that is indicative of being abnormal via an unencrypted signal, the body control module is to:
associate time data from the synchronization clock with the unencrypted signal; and
store the associated unencrypted signal and time data in vehicle memory.

4. The system of claim 1, further comprising an infotainment head unit (IHU), wherein, if the encrypted signal is authentic, the IHU is configured to display a message indicating the abnormal tire pressure data.

5. The system of claim 4, wherein the IHU is configured to display the message until the tire pressure data is within a predetermined range.

6. The system of claim 1, wherein the body control module is to determine that the encrypted signal is authentic when the encrypted signal is encrypted with a mutually agreed upon secret key.

7. The system of claim 1, wherein the body control module is to determine that the encrypted signal is authentic when the encrypted signal is encrypted with a mutually agreed upon secret key and when the tire pressure sensor is within a threshold distance based on time of flight localization.

8. The system of claim 1, wherein the body control module is to determine that the encrypted signal is authentic when the encrypted signal is encrypted with a mutually agreed upon secret key and when arrival angles of the received signals match a predetermined range of arrival angles.

9. A method of a tire pressure monitoring system for a vehicle comprising:
determining, by tire pressure sensors each including memory storing a threshold value and a controller, whether tire pressure data measured by the tire pressure sensors is abnormal based on the threshold value;
when one of the tire pressure sensors determines the tire pressure data measured by it is abnormal, transmitting a mode switch request to enter an encrypted mode with a body control module, and transmitting the tire pressure data using an encrypted signal; and
accepting, by the body control module, the tire pressure data after authenticating the encrypted signal.

10. The method of claim 9, further comprising:
determining, by a global positioning system (GPS) receiver, a location of the vehicle in response to receiving the tire pressure data that is indicative of being abnormal via an unencrypted signal;
associating, by the body control module, the location with the unencrypted signal; and
storing the associated unencrypted signal and location in vehicle memory.

11. The method of claim 9, further comprising:
determining, by a synchronization clock, time data in response to receiving the tire pressure data that is indicative of being abnormal via an unencrypted signal;
associating, by the body control module, time data from the synchronization clock with the unencrypted signal; and
storing the associated unencrypted signal and time data in vehicle memory.

12. The method of claim 9, further comprising when the encrypted signal is authentic, displaying, on an infotainment head unit, a message indicating the abnormal tire pressure data.

13. The method of claim 12, wherein the IHU is configured to display the message until the tire pressure data is within a predetermined range.

14. The method of claim 9, wherein determining that the encrypted signal is authentic includes determining that the encrypted signal is encrypted with a mutually agreed upon secret key.

15. The method of claim 9, wherein determining that the encrypted signal is authentic includes determining that the encrypted signal is encrypted with a mutually agreed upon secret key and determining that an originating one of the tire pressure sensors is within a threshold distance based on time of flight localization.

16. The method of claim 9, wherein determining that the encrypted signal is authentic includes determining that the encrypted signal is encrypted with a mutually agreed upon secret key and determining that arrival angles of the received signals match a predetermined range of arrival angles.

* * * * *